Nov. 1, 1960 G. C. MANDELL 2,958,475

TAPE RECORDER

Filed July 25, 1957 7 Sheets-Sheet 1

INVENTOR.

George C. Mandell

BY

Watson D. Harbaugh

Attorney

Nov. 1, 1960

G. C. MANDELL 2,958,475

TAPE RECORDER

Filed July 25, 1957

7 Sheets-Sheet 2

INVENTOR.
George C. Mandell
BY
Watson D. Harbaugh
Attorney

Nov. 1, 1960 G. C. MANDELL 2,958,475

TAPE RECORDER

Filed July 25, 1957 7 Sheets-Sheet 3

INVENTOR.
George C. Mandell

BY Watson D. Harbaugh

Attorney

INVENTOR.
George C. Mandell
BY
[signature]
Attorney

INVENTOR.
George C. Mandell
BY Vaton D. Harbaugh
Attorney

INVENTOR.
George C. Mandell
BY
Watson D. Harbaugh
Attorney

INVENTOR.
George C. Mandell
BY
Watson D. Harbaugh
Attorney 2,958,475

TAPE RECORDER

George C. Mandell, Des Plaines, Ill., assignor to Webcor, Inc., Chicago, Ill., a corporation of Illinois Filed July 25, 1957, Ser. No. 674,139

17 Claims. (Cl. 242—55.12)

This invention relates to tape recorders, and more particularly to a tape recorder having manually operable "play/record" and "forward-rewind" control means, respectively, adapted to interlock and maintain one of the controls in inoperative position when the other is in operative position while effecting simultaneous braking action on both the take-up wheel and supply reel, and also to assure that recording action will not be available except when the "play" control is turned to operative position.

Heretofore, there has been a hazard of inadvertent actuation of one or the other of the "play/record" or "rewind-forward" controls while the other control is "on," or of recording when this is not desired; and tape has been frequently spoiled either by such actuation, or by the likelihood of tape spilling due to the lack of simultaneous braking action on each of the reels.

Accordingly, it is an object of the present invention to provide a tape recorder in which a manually operable "off" and "play/record" control is adapted to coact with a manually operable "forward-rewind" control, so that when each of these controls is placed in neutral position, they will be interlocked to effect simultaneous braking action upon the pair of reels for the recorder.

Another object of the invention is to provide a recorder as described, wherein when either of the manually operable controls is moved from neutral position, the tape-braking means will be simultaneously released from each of the reels.

Another object of the invention is to provide manually operable means for placing the tape recorder in record condition, while assuring release of the said manually operable record means when the "forward" control is actuated.

Another object of the invention is to provide a manually operable record control means as described, having a camming structure whereby pressure on one side of the control is effective to place it in locked position for level setting and/or public address use, while pressure on the other side of the control is effective to afford release thereof.

Another object of the invention is to provide a "forward-rewind" control adapted to coact with the means for affording simultaneous application and release of the brakes for the respective reels as described, and also to provide for simultaneous speed adjustment switching suitable for forward or rewind action, respectively.

Another object of the invention is to provide a forward-rewind control means as described, which is adapted to coact with means for moving the take-up reel into drive relation with the motor of the recorder.

Another object of the invention is to provide means for changing the drive speed of the tape recorder during play and without interruption of the play.

Another object of the invention is to provide a tape recorder, wherein the record control means is adapted to be maintained in operative position during either "play" or "off" positions so as to provide recording or an amplifier selectively, the tape being stationary during the latter use.

Other objects and advantages of the invention will become apparent as the description proceeds in accordance with the drawings, in which.

Figure 1:
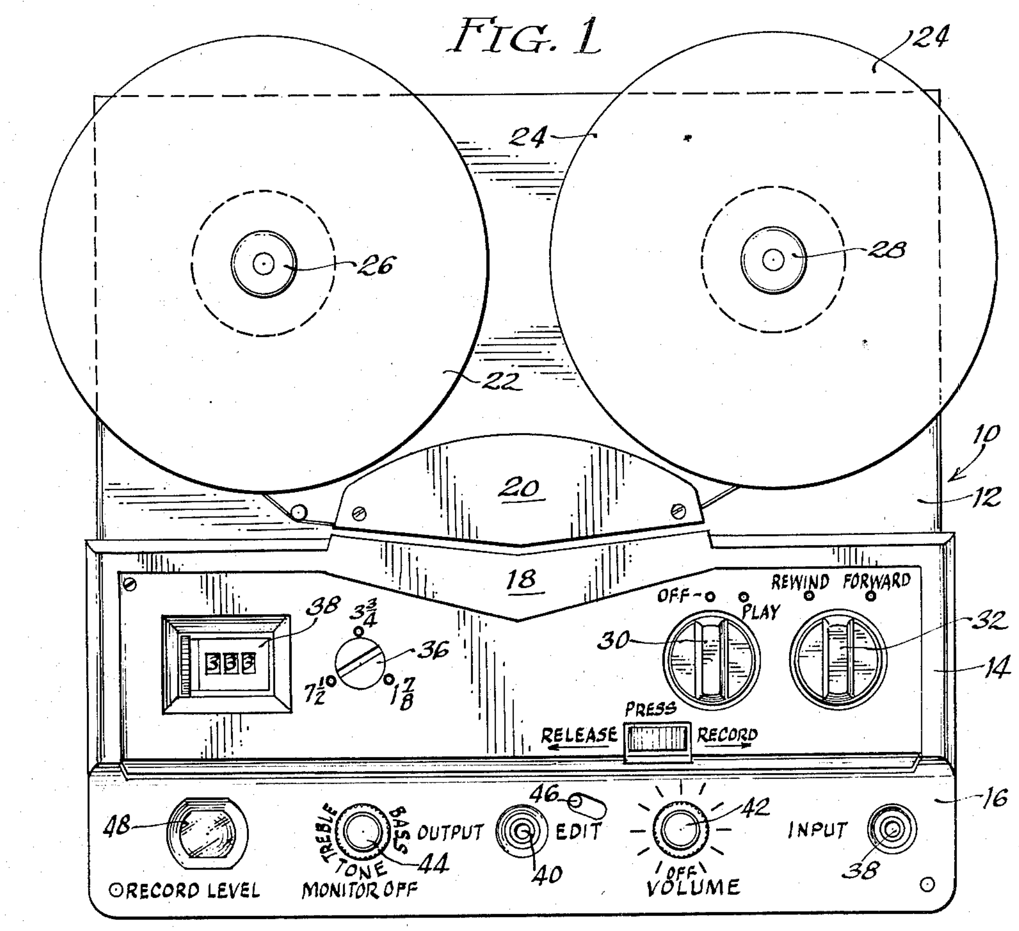
Figure 1 is a top plan view of the tape recorder.
Figure 2:
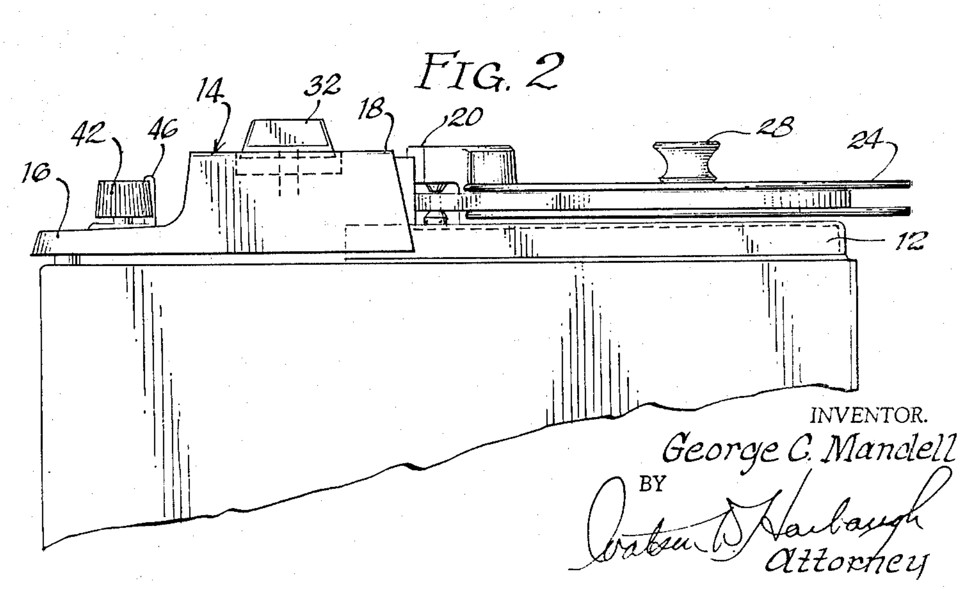
Figure 2 is a side elevational view, partly broken away, of the recorder shown in Figure 1.

Referring now to Figures 1 and 2, the tape recorder 10 of the invention is removably provided with cover elements 12 and 14, as well as a permanent front panel 16. The cover 14 has integrally formed therewith a guide structure 18 coacting with a complementary guide structure 20 secured to the cover portion 12. A pair of reels 22 and 24 are removably secured upon the hub elements 26 and 28 for playing the tape from left to right, or providing forward and rewind tape movement as hereinafter set forth.

A manually operable control 30 is adapted to effect play/record and shut-off action for the tape, and a forward-rewind control 32 is provided for manual operation in conjunction with the control 30, as also hereinafter set forth. In accordance with the concept of the invention, a record control 34 is provided, and is adapted to be operative when the play control 30 is in either play or off position and the forward-rewind control 32 is in the neutral position shown in solid lines. A kerfed speed control turn screw 36 is also mounted in the cover 14, and the cover is apertured to provide a position indicator for the tape during rewind or forward action, as provided by control knob 32. The front panel 16 includes an input plug 38, an output plug 40, an off and volume control knob 42, a bass and treble tone control knob 44, an edit bar 46, and a glass-paneled record level indicator 48.

Therefore, a sector-shaped plate 50 is fixedly secured to a shaft 52 by means of a collar 54 and radial screws 56 and 58, the shaft 52 being journalled in a top wall 60 and supported against axial movement by means of a sleeve 62 having an enlarged lower end 64 as hereinafter described. The plate 50 defines an arcuate recess 68 which is adapted to receive a relatively large ball bearing 70 which is freely held in an upstanding interlock bracket 74, and a depending camming pin 76 is secured to the plate 50 in position to cam a cross piece 78 of a slide 80—this slide defining a slot 82 receiving the bracket 74, and mounted for slidable movement on the top wall 60 by means of a pair of guide pins 84 and 86 which are received in slots 88 and 90. It will be seen that the slide 80 is biased rearwardly by a spring 92 which is affixed to the top wall 60 at one end by means of a tab 94 and at the other end to a tab 96 on the slide 80.

The cross piece 78 has a corresponding arm 98 adapted to be actuated by a circular disc 100, which is fixedly secured by a collar 102 and screws 104 and 106 to a shaft 108 on which is fastened the control knob 32. The shaft 108 is journalled in the top wall 60 and mounted for axial movement relative thereto—the shaft 108 and disc 100 being biased upwardly by means of a helical spring 110 bearing at its upper end against the disc 100 and at its lower end against the top wall 60, this upward movement being limited by a bearing 112 carrying a bell crank 114 whose operation will be set forth in further detail as the description proceeds. Thus, the lower end of the shaft 108 is provided with a retainer 116 adapted to engage the bell crank 114.

Figure 4:
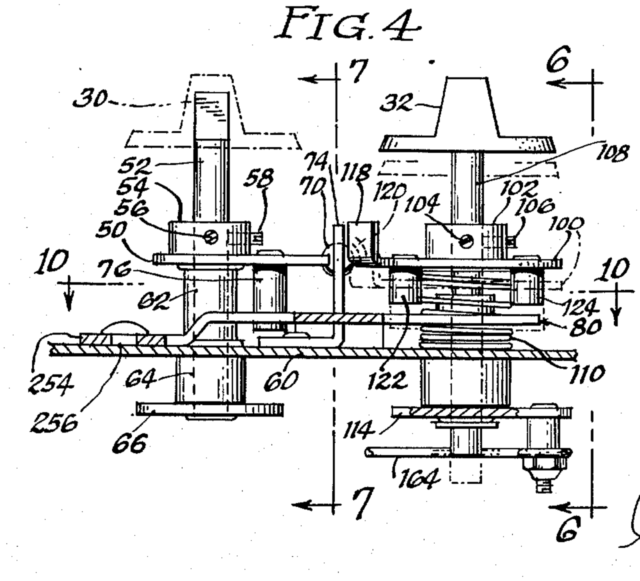
Figure 4 is a vertical sectional view taken along the lines 4—4 of Figure 3.
Figure 5:
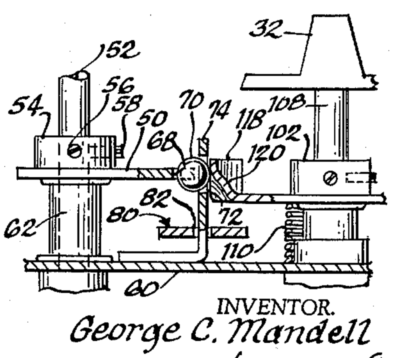
Figure 5 is a view taken along the same lines as the view of Figure 4, and showing the interlock means of the pair of manually operable play and rewind controls.

As seen more particularly in Figures 4 and 5, the disc 100 has an upstanding arcuate peripheral bearing flange 118 which defines an arcuate pocket 120 adapted to snugly receive the ball bearing 70 and to permit passage of the bearing therepast as the occasion may require. Actuation of the cross piece 98 and the slide 80 is accomplished by means of a pair of depending pins 122 and 124 having a length such as to pass freely above the cross piece in the normal, upwardly biased position of the disc 100, but to engage the cross piece when the disc is moved downwardly. Thus, when the plate 50 is positioned as shown in Figure 4 so that the recess 68 is out of register with the ball bearing 70, the ball bearing is forced to extend outwardly on the other side of the bracket 74, thereby to engage in the pocket 120 and to lock the disc 100 against rotation.

Figure 3:
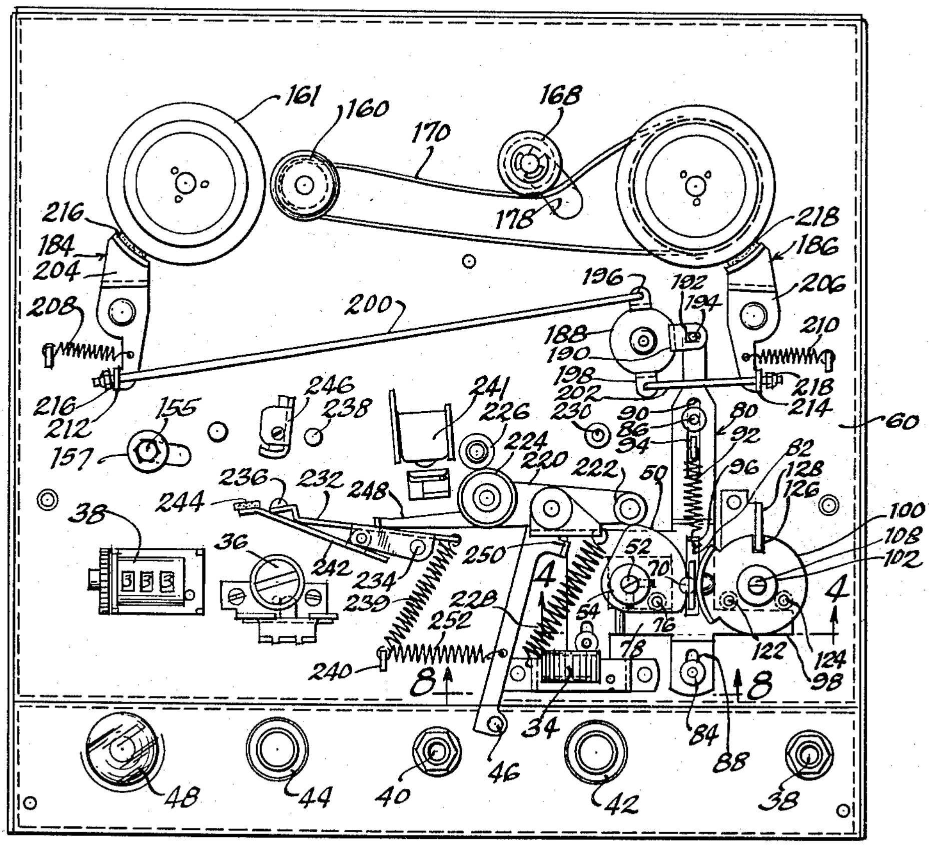
Figure 3 is a top plan view according to Figure 1, but with the top casings of the recorder removed.
Figure 6:
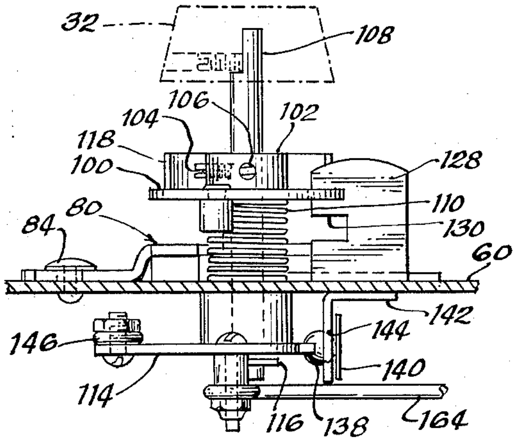
Figure 6 is a vertical sectional view taken along the lines 6—6 of Figure 4.
Figure 7:
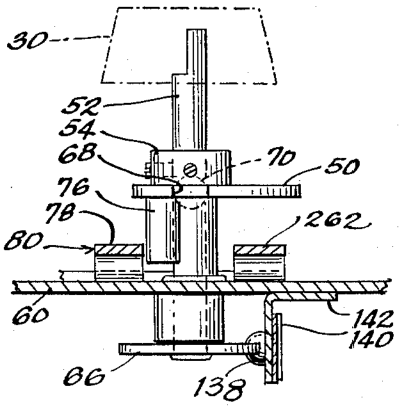
Figure 7 is a vertical sectional view taken along the lines 7—7 of Figure 4.

Conversely, however, when the ball bearing 70 is received in the recess 68 of the plate 50, as shown in Figure 5, the ball bearing does not protrude beyond the bracket 74, but instead coacts with the upstanding arcuate flange 118 to permit rotation of the disc 100, the disc being moved downward manually for this purpose. As best shown in Figures 3 and 6, the disc 100 has formed therein a radial slot 126 adapted to receive a vertical lock plate 128 so as to hold the disc 100 securely against rotation in the upper position thereof. However, the lock plate 128 is provided with a recess 130 having a depth sufficient to afford free rotation of the disc 100 when that disc is moved downwardly as described.

Figure 11:
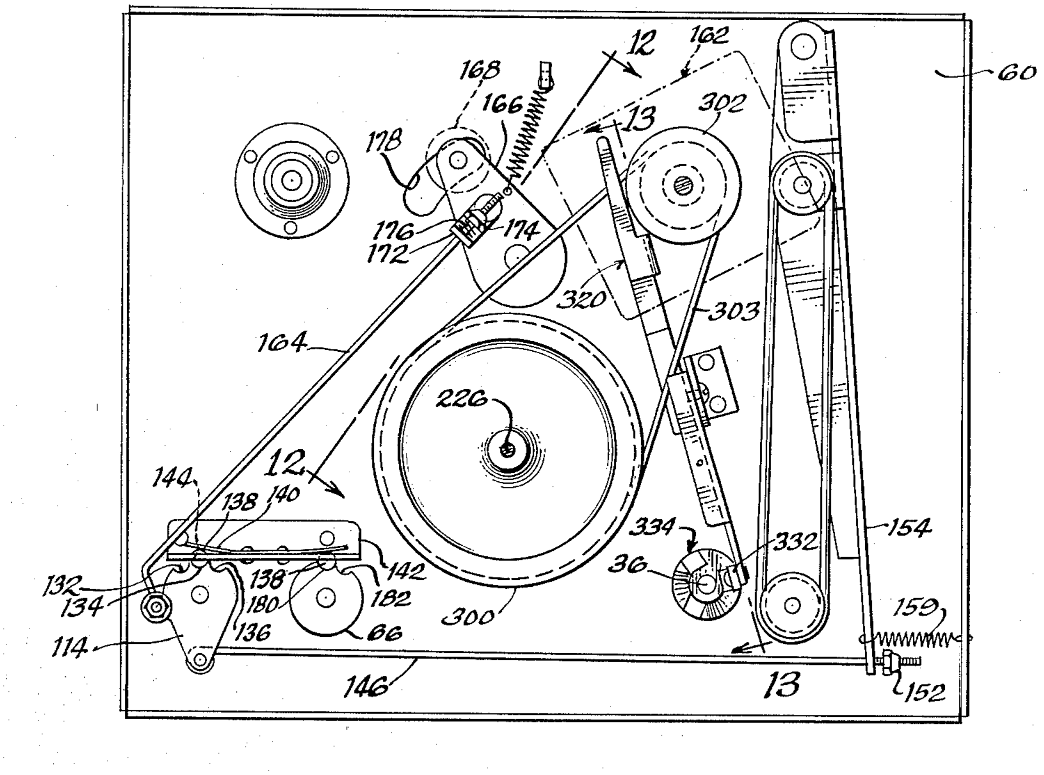
Figure 11 is a bottom plan view of the parts shown in Figure 3.

The action of the disc 100 is effective to provide three settings—forward, neutral and rewind—as shown in Figure 1, but it will be seen in Figures 6 and 11 that means are provided in the bell crank 114 to hold the disc securely in any one of these positive positions, including the bell crank 114 and a set of three recesses 132, 134 and 136, a ball bearing 138 being biased into latching engagement with any given recess with which it may be in register by a spring blade backing element 140 affixed to a bracket 142 which defines an aperture 144 for receiving the ball bearing 138.

The switching function of the knob 32 and disc 100 is effected by means of an elongated wire 146, for the rewind and forward controls respectively, as shown in Figure 11. It will be seen, however, that the outer extremity of the wire 146 is threaded to receive a nut 152 in calibrated relationship to a pivot arm 154, in which the wire 146 is slidably received. The wire 146, upon movement to "rewind" is effective to pull the pivot arm 154. The pivot arm is slidably mounted on the top wall 60 by means of a pin 155 and washer 157, and accordingly will move as a unit, as controlled by the spring 159, to carry the wind-up reel hub 161 into frictional engagement with a drive pulley 160 which is directly driven by the motor 162.

The drive pulley 160 is effective to drive the take-up reel 24 at a desired rate so that when tape is being fed through the machine, and with the ball bearing 138 in the recess 134 of bell crank 114, a wire 164 which is pivotally secured to the bell crank 114 will hold a bell crank 166 in a position where a roller 168 journalled on the bell crank 166 will contact the drive belt 170 with an appropriate amount of pressure. The outer end of the wire 164 is slidably held in a bracket 172 for this purpose, the wire being threaded to receive an adjustment nut 174 holding a spring 176 so that the amount of movement of the roller 168 in the arcuate groove 178 through which it is received may be controlled accurately to assure proper take-up speed.

Figures 19, 20:
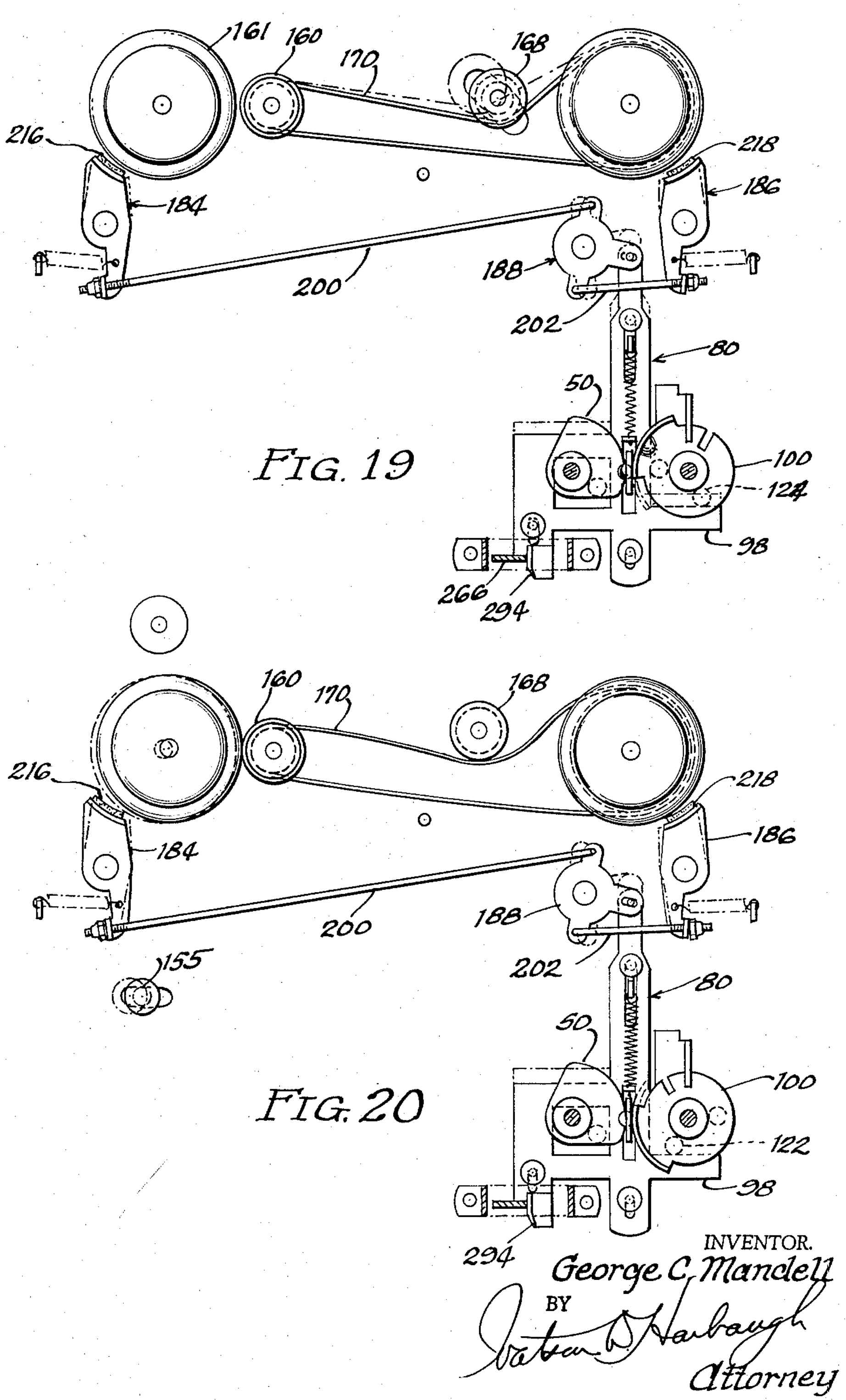
Figure 19 is a view showing the interrelation of manual control means according to the present invention; with the forward-rewind control means turned forward.
Figure 20 is a view corresponding to the view of Figure 19 showing the forward-rewind control means turned to "rewind"
Figure 21:
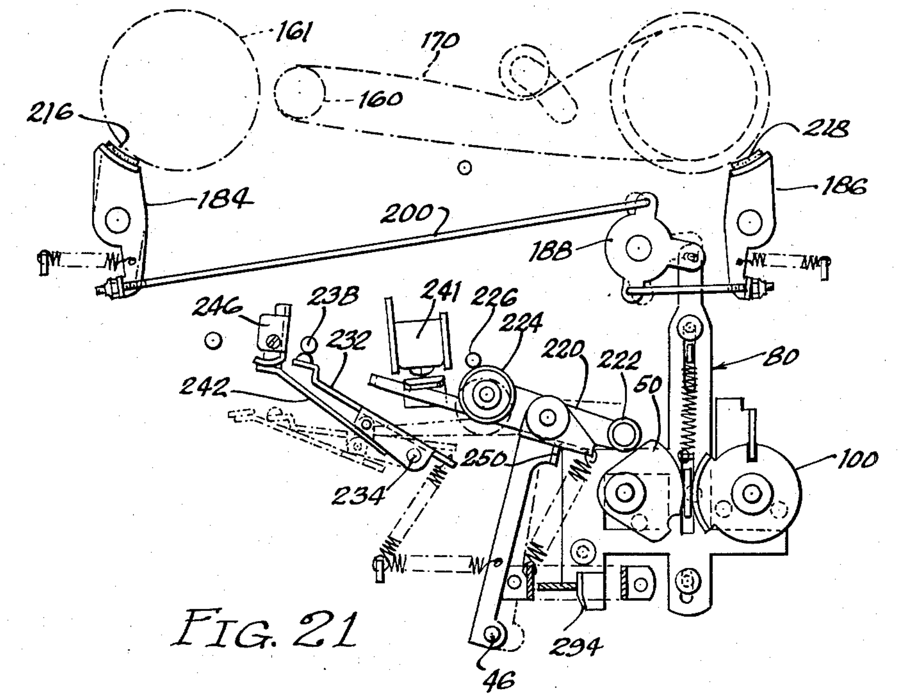
Figure 21 is a view corresponding to the views of Figures 19 and 20, showing the play control turned to "play" position.

However, when it is desired to use the rewind reel 22, a great deal of slackness is required in the drive belt 170, and this is achieved by the movement of bell crank 114 as the knob 32 is turned to the rewind setting, thereby drawing the roller 168 away from the belt, as seen in Figure 20. Conversely, a high degree of tautness or tension is needed to impart speed from the drive pulley 160. This is accomplished by the opposite movement of the bell crank 114 when the knob 32 is turned to "forward," such movement being required to move the bell crank 166 to a position which will carry roller 168 toward the tape as shown in Figure 19.

The holding plate 66 is provided with recesses 180 and 182 for maintaining the plate 50 in the "off" and "play" positions respectively, a ball bearing 138 being biased against the plate 66 by the spring blade backing element 140. Referring again to Figure 3, it has been noted that the locking mechanism provided by the ball bearing 70 and structure associated therewith, prevents rotation of one of the controls 30 and 32 when the other control is in an operative position. Thus, for example, when control 30 has been turned to "play/record" control 32 cannot be moved from the neutral position. But it will be observed that whichever of the controls is turned to operative position (play, rewind or forward), the slide 80 is actuated as hereinbefore described. This has the effect of releasing both brakes 184 and 186 simultaneously, as well as assuring automatic clamping on of the brakes when the control is again moved to neutral, thereby preventing the tape from spilling or becoming loose.

The means whereby this is accomplished includes a pivot disc 188 journalled on the cover 60, and having an extension 190 provided with a lost motion slot 192 in which is received a pin 194 at the end of the slide 80. At right angles to the extension 190 are a pair of ears 196 and 198 which have pivotally secured therein wires 200 and 202 respectively. Each of these wires in turn provides a linkage for brake means for the reels 22 and 24, provided on rocker arms 204 and 206 respectively, which are spring biased by springs 208 and 210 into braking engagement with the said reels. The rocker arms 208 and 210 are formed with upstanding flanges 212 and 214, each defining an aperture for slidably receiving the wire for calibrated release of the brakes, the wires 200 and 202 each having nuts 216 and 218 threadedly secured to their outer ends. Thus, clockwise movement of the pivot disc 188, in response to turning knob 30 to "play/record" or knob 32 to "rewind" or "forward" pulls the rocker arms 204 and 206 until the brake shoes 216 and 218 are disengaged with respect to the reels 12 and 14.

Movement of the tape feed controls into playing position is also accomplished by the simple rotation of control 30 in the clockwise direction. Thus, the sector-shaped plate 50 has the edge of the arc continuous with its upper radial edge positioned so as to cam a rocker arm 220 counter-clockwise, when the control 30 is in "off" position, by means of the roller 222, so that roller 224 is separated from drive spindle 226. When the knob 30 is turned to "play/record," however, the roller 222 rides around the corner between the outer arc of the plate 50 and its upper radial edge, and then down the said edge until the rocker arm 220 has been turned counter-clockwise, as pulled by spring 228, a distance such as to bring the roller 224 into firm contact with the drive spindle 226, so that tape will be securely held therebetween and passed at the proper rate around the guide post 230 to the take-up reel 24.

It will be noted that a pivot arm 232 is mounted on a vertical post 234 so that a nylon contact head 236 is biased against a guide post 238 by a spring 239 secured to a post 240 when tape is being pulled past the magnetic head 241, while a second arm 242 is pivotally mounted on the arm 232, the arm 242 being spring biased in the clockwise direction and carrying a felt head 244 to contact the "erase" head 246. But, as shown in Figure 3, an extension 248 of the pivot arm 220 is adapted to cam against the arm 232 to maintain it in inoperative position until such time as the knob 30 is turned to play. The extension 248 is effective also in holding the tape in proper relationship to the magnetic head 241 during play. In order to provide editing, the edit lever 46 has formed therein an upstanding camming bracket 250 adapted to engage the pivot arm 220 when the edit lever is pulled counter-clockwise, against the spring 252 which is secured to the outer end of the edit lever and the post 240 formed on the top wall 60.

Figure 8:
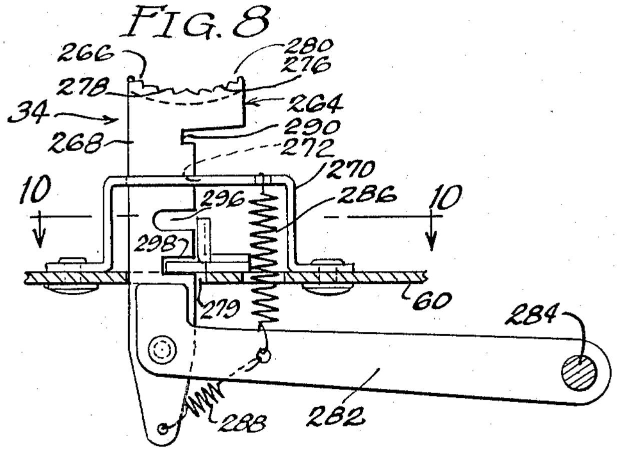
Figure 8 is a vertical sectional view taken along the lines 8—8 of Figure 3.
Figure 9:
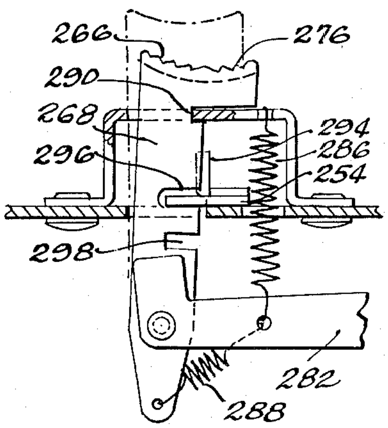
Figure 9 is a view corresponding to the view of Figure 8, and showing the record means in locked position.
Figure 10:
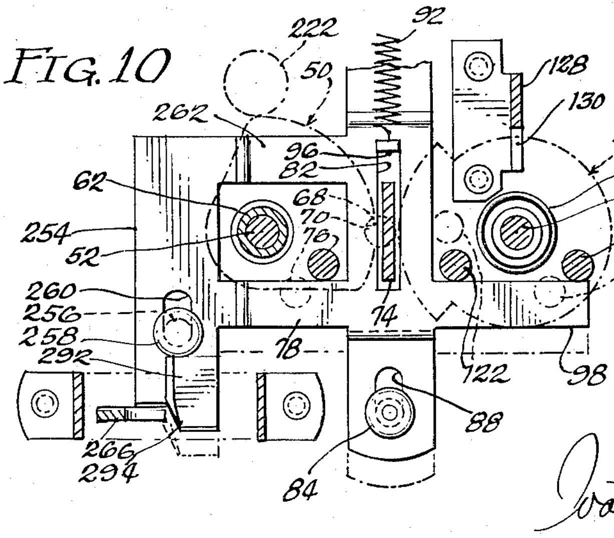
Figure 10 is a top plan view taken through the lines 10—10 of Figure 4.

Not only does placing one of the controls 30 and 32 in operative position prevent such movement of the other control, as stated, but it likewise prevents the record control 34 from being depressed. This is a safety factor which results from the rearward camming of the cross pieces 78 and 98 previously described. As seen in Figures 8 to 10, and Figure 10 in particular, the cross piece 78 is formed integrally with a slide bar 254 adapted to slide in abutting relationship with the wall 60 by means of a guide pin 256 and washer 258, the pin 256 being received in a slot 260. The cross piece 78 is elevated a slight amount for affording effective camming action with the depending camming pin 76, and accordingly the slide bar 254, as well as a slightly elevated bar 262 parallel with the bar 78, assure a balanced action for the slide 80.

The record control 34 includes a camming head 264 having an upwardly and outwardly inclined release surface 266 mounted directly above a plunger 268 slidably received in a bridge 270 defining an aperture 272, and in an aperture 274 in the wall 60, and an upwardly and outwardly inclined latching surface 276 which extends to the right of the plunger 268. Preferably, the surface 266 is provided with ridges 278 toward the center of the head 264 to transmit force applied to the surface 266 in a counter-clockwise direction, while the surface 276 has ridges 280 also inclined to the center of the head 264 so as to transmit force applied to surface 276 in the clockwise direction.

In order to transmit switching action to the recorder, the plunger 268 is pivotally connected to a lever 282 fixedly connected to a shaft 284 journalled in suitable brackets formed in the front panel, and the shaft 284 has fixedly secured thereto linkage means (not shown) for actuating the record switch—the latter providing slide and stop means for limiting the upper position of the plunger. The plunger is biased upwardly by a spring 286 secured to the bridge 270 and to the lever 282, and in order to bias the plunger 268 toward its release position, or counter-clockwise, a spring 288 connects the lower end of the plunger and the lever 282.

Latching of the plunger to provide the record setting is accomplished by means of a notch 290 in the plunger adapted to engage the bridge 270 when the head surface 276 is pressed, as shown in Figure 9; and release is effected by pressing surface 266. However, in order to assure that the "record" setting will not be on when the knob 32 is in operative position, slide bar 254 has formed therein a cam lug 292, which desirably is formed from the material of the bar in upstanding relationship thereto, and with its tip 294 bevelled to a slight extent. Thus, a means is provided to move the plunger 268 counter-clockwise and release the locked relation shown in Figure 9 whenever the slide 80 is cammed backward by actuation of the cross piece 98, it being seen that this will move the slide clockwise slightly so that the camming and release of the plunger 268 is accomplished rapidly. However, when the cross piece 78 is cammed by the depending cam pin 76, the slide 80 is turned counter-clockwise, so that the cam lug 292 passes by plunger 268 without releasing it.

Below the notch 290 in the plunger 268 are a pair of vertically spaced slots 296 and 298. In order to prevent operation of the recorder when either of the knobs 30 and 32 is moved to operative position, i.e., during either "play," or "rewind" and "forward," the recess formed by the upstanding cam lug 292 extends rearward a distance just sufficient so that when the slide 80 is in its normal, braking position, the plunger may move vertically, but when the knobs are turned to the operative position, the slide bar 254 in back of the recess will move into slot 298, to hold the record control against downward movement. However, when the knob 30 is turned to play, the plunger 268 is not cammed, as stated, by cam lug 292; and to assure that record will not be accidentally released at such time, the slide bar 254 enters slot 296.

One of the advantages of the present invention is the fact that the plunger 268 may be held down in operative position as shown in Figure 9, with the knob 30 in "off" position. Since this position assures that the tape will be stationary, the device can be used as an amplifier system without the need for extra parts.

Figure 12:
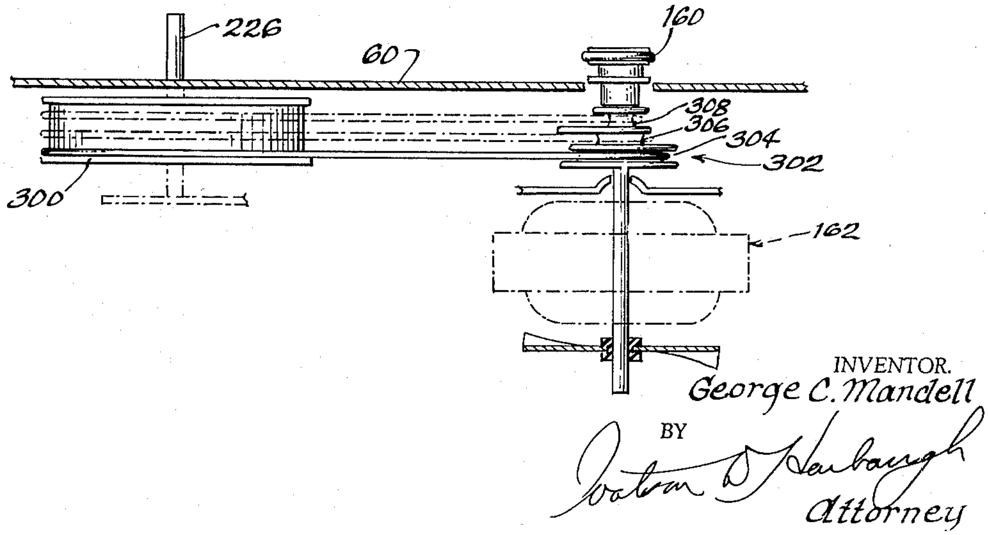
Figure 12 is a vertical sectional view taken along the lines 12—12 of Figure 11.

When the machine is set at "play," speed change can be accomplished by means of the kerfed screw 36 without interference with tape travel. As seen in Figure 11, an even speed is assured by means of a fly wheel 300 actuated by the motor 162 which drives a pulley wheel 302, a cord 303 transmitting rotational energy from the wheel 302 to the fly wheel 300. The fly wheel 300, in turn, rotates the drive spindle 226 as seen in Figures 11 and 12.

The pulley 302 is a three-speed pulley, comprising a lower pulley 304 of relatively large diameter for fast speed, an intermediate pulley 306 for intermediate speed, and an upper pulley 308 for slow—these speeds corresponding to indicia surrounding the said kerfed screw 36.

The lower pulley 304 is separated from the upper intermediate pulley 306 by an annular flange 310 having an arcuate dog 312 of greater radius than flange 310 and extending peripherally therearound for less than 180°. Likewise, the intermediate pulley 306 is separated from the upper pulley 308 by a flange 314 having a dog or finger 316 extending outwardly thereof a predetermined extent. Preferably, finger 316 is tapered, and both the dogs 312 and 316 terminate substantially at the outer end of the radius of the lower flange 318 of the lower pulley 314.

In order to move the cord 303 from the lower pulley to the intermediate pulley, or to the upper pulley (any desired change being possible by the construction of the dogs 312 and 316), a belt shifter 320 is provided which is pivotally supported by brackets 322 from the top wall 60. The belt changer 320 includes a duck bill 324 comprising a pair of substantially parallel, relatively narrow blades 326 and 328 and a roller bar 330 carrying a roller 332 biased against a substantially helical cam 334 by a spring 336 having one end connected to the top wall 60 and the other on the roller bar 330. The cam 334 is preferably a brass cylinder affixed to the kerfed screw 36 and the helical path 336 of the cam 334 is coaxial therewith and defines three roller seats or latching points 338, 340 and 342 so that the belt shifter 320 will engage the belt or cord 303 to maintain it in register with the pulley 304 when the roller 332 is in the upper notch 338.

Figures 13, 14, 15, 16, 17:
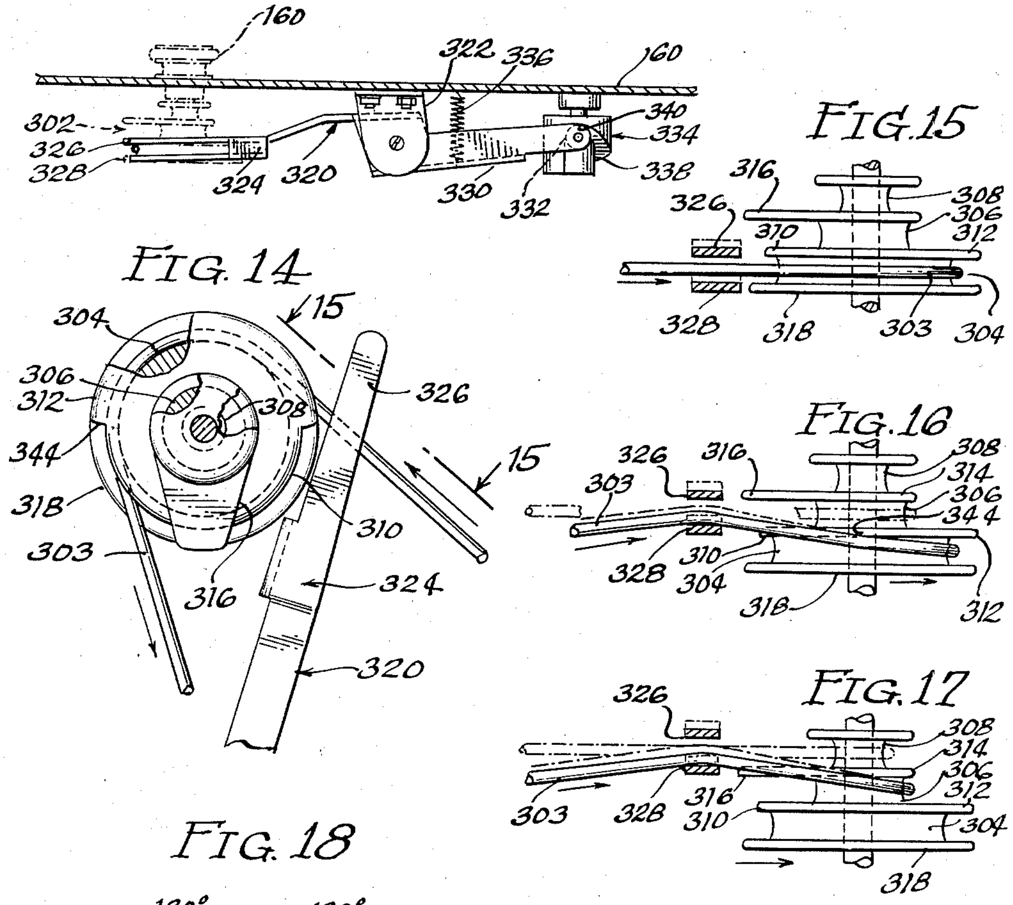
Figure 13 is a vertical sectional view taken along the lines 13—13 of Figure 11.
Figure 14 is a top plan view taken below the top support wall of the tape recorder, and showing the speed control means according to the present invention.
Figure 15 is a vertical sectional view taken along the lines 15—15 of Figure 14.
Figure 16 is a view corresponding to that of Figure 15, and showing the elements in a different speed change position.
Figure 17 is a view corresponding to the views of Figures 15 and 16, but showing the elements in even another speed change position.
Figure 18:
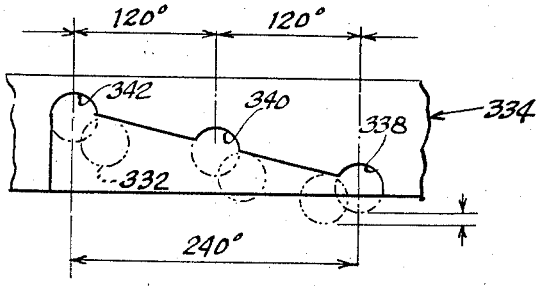
Figure 18 is a developed view of cam means for the belt shifter shown in Figures 14 through 17.

Angular rotation of the kerfed screw to the intermediate notch 340 serves to lift the belt 303, which is slightly resilient for the purpose, to the level of the intermediate pulley 306; and the edge 344 of the arcuate flange or dog 312 will engage the belt while the pulley 302 is driving the fly wheel 300 to move the belt 303 onto the shelf thus provided and place it in operative position on the pulley 306, as shown in Figure 16. Because of the fact that the notch 340 is formed in the helical path 336, the belt shifter 320 will raise the belt slightly higher than level with the pulley 306 during initial shifting movement so as to assure full engagement with the dog 312 and transfer to the said pulley 306 without catching below the dog 312. Also, when transfer to pulley 308 is to be accomplished, by rotation of the said kerfed screw 36, the belt shifter 320 will lift the belt onto the dog 316 with a slight amount of overtravel, so as to assure the belt will engage the dog 316 and will not be dragged below the dog 316. Shifting will therefore be accomplished during a single rotation of the pulley 302 and without the slightest interruption of the tape.

Although I have herein set forth and described my invention with respect to certain principles and details thereof, it will be evident to those skilled in the art that changes may be made therein without departing from the principles thereof as set forth in the hereunto appended claims.

I claim:

1. In a tape recorder having a pair of reels, and a motor-actuated drive spindle, a manually operable off-play control, a manually operable control adapted to effect forward or rewind action, a cam plate on said first control, said cam plate defining a recess therein, a cam disc on said second control, said cam disc defining a recess therein, a ball bearing and means for retaining said ball bearing between said cam plates for reception in one or the other of said recesses selectively whereby when said first control is in play position said second control is locked in neutral position and when said second control is in forward or rewind position said first control is locked in off position, bell crank means on said second control, and switch means operable by said bell crank means for energizing said tape recorded for forward or rewind action.

2. In a tape recorder having a pair of reels and a motor-actuated drive spindle, a manually operable off-play control, a manually operable control adapted to effect forward or rewind action, a cam plate on said first control, said cam plate defining a recess therein, a cam disc on said second control, said cam disc defining a recess therein, a ball bearing and means for retaining said ball bearing between said cam plates for reception in one or the other of said recesses selectively whereby when said first control is in play position said second control is locked in neutral position and when said second control is in forward or rewind position said first control is locked in off position, bell crank means on said second control, switch means operable by said bell crank means for energizing said tape recorder for forward or rewind action, a pulley wheel driven by the motor for said tape recorder, a belt loosely connecting said pulley wheel and one of said reels, a bell crank carrying a roller engaging said belt and means connecting said first bell crank and said second bell crank for moving said roller into belt-tightening and belt-loosening relationship with said belt when said second control is moved to forward or rewind positions respectively.

3. In a tape recorder having a pair of reels, and a motor-actuated drive spindle, a manually operable off-play control, a manually operable control adapted to effect forward or rewind action, a cam plate on said first control, said cam plate defining a recess therein, a cam disc on said second control, said cam disc defining a recess therein, a laterally movable interlock member, means for retaining said member between said cam plates for reception in one or the other of said recesses selectively whereby when said first control is in play position said second control is locked in neutral position, and when said second control is in forward or rewind position said first control is locked in off position, and separate coacting brake means engaged simultaneously with each of said reels when said first control is moved to play position and when said second control is moved to rewind or release position, and released simultaneously when said first control is turned to off position or said second control is turned to neutral position.

4. In a tape recorder having a pair of reels, one of which serves as a take-up reel, and a motor-actuated drive spindle, releasable transmission for driving said take-up reel, a manually operable off-play control, a manually operable control adapted to effect forward or rewind action, a cam plate on said first control, said cam plate defining a recess therein, a cam disc on said second control, said cam disc defining a recess therein, a laterally movable interlock member, means for retaining said member between said cam plates for reception in one or the other of said recesses selectively whereby when said first control is in play position said second control is locked in neutral position, and when said second control is in forward or rewind position said first control is locked in off position, and separate coacting brake means engaged simultaneously with each of said reels when said first control is moved to play position and when said second control is moved to rewind or release position, and released simultaneously when said first control is turned to off position or said second control is turned to neutral position and means for releasing said transmission when said second control is moved from its resting position.

5. In a tape recorder having a pair of reels, and a motor-actuated drive spindle, a manually operable off-play control, a manually operable control having a neutral position and adapted upon movement selectively from said neutral position to effect forward or rewind action, a cam plate on said first control, said cam plate defining a recess therein, a cam disc on said second control, said cam disc defining a recess therein, a ball bearing and means for retaining said ball bearing between said cam plate and said cam disc for reception in one or the other of said recesses selectively whereby when said first control is in play position said second control is locked in neutral position and when said second control is in forward or rewind position said first control is locked in off position, slide means actuated in one direction when said first control is moved to play position or said second control is moved to forward or rewind position and in the other direction when said first control is moved to off position or said second control is moved to neutral position, and a manually operable record control adapted to be activated when said first control is in off position and said second control is in neutral position, said slide having latch means adapted to engage said record control when said record control is in activated position, said slide having cam means adapted to release said record control from said activated position when said second control is moved to forward position, said record control and said latch being adapted to lock said record control in activated position when said first control is moved to play position.

6. In a tape recorder having a pair of reels, and a motor-actuated drive spindle, a manually operable off-play control, a manually operable control having a neutral position and adapted upon movement from said neutral position to effect forward or rewind action, a cam plate on said first control, said cam plate defining a recess therein, a cam disc on said second control, said cam disc defining a recess therein, a ball and means for retaining said ball between said cam plate and said cam disc for reception in one or the other of said recesses selectively whereby when said first control is in play position said second control is locked in said neutral position and when said second control is in forward or rewind position said first control is locked in off position, means actuated in one direction when said first control is moved to play position or said second control is moved to forward or neutral position and in the other direction when said first control is moved to off position or said second control is moved to neutral position, a manually operable record control adapted to be energized when said first control is in off position and said second control is in neutral position, said actuated means having latch means adapted to engage said record control when said record control is in energized position, said actuated means having cam means adapted to release said record control from energized position when said second control is moved to forward position, said record control and said latch being adapted to lock said record control in energized position when said first control is moved to play position, a brake for each of said reels and means connecting each of said brakes and said actuated means adapted to operate said brakes when said actuated means is moved in said one direction and to release said brakes when said actuated means is moved in the other direction.

7. In a tape recorder having a pair of reels, and a motor-actuated drive spindle, a manually operable off-play control, a manually operable control having a neutral position and adapted to effect forward or rewind action when moved from its neutral position, a cam plate on said first control, said cam plate defining a recess therein, a cam disc on said second control, said cam disc defining a recess therein, a ball and means for retaining said ball between said cam plate and said cam disc for reception in one or the other of said recesses selectively whereby when said first control is in play position said second control is locked in neutral position and when said second control is in forward or rewind position said first control is locked in off position, slide means actuated in one directoin when said first control is moved to forward or neutral position and in the other direction when said first control is moved to off position or said second control is moved to neutral position, a manually operable record control adapted to be energized when said first control is in off position and said second control is in neutral position, said slide means having latch means adapted to engage said record control when said record control is in energized position, said slide means having cam means adapted to release said record control from energized position when said second control is moved to forward position and said record control and said latch being adapted to lock said record control in energized position when said first control is moved to play position, a rocker arm having a roller thereon biased into tape-driving relationship with said spindle, said cam plate being adapted to cam said rocker arm away from said spindle when said first control is in off position and to permit said tape-driving relationship when said first control is in play position.

8. In a tape recorder having a pair of reels and a motor-actuated drive spindle, a manually operable off-play control, a manually operable control adapted to effect forward or rewind action, a cam plate on said first control, said cam plate defining a recess therein, a cam disc on said second control, said cam disc defining a recess therein, a ball bearing, means for retaining said ball bearing between said cam plates for reception in one or the other of said recesses selectively whereby when said first control is in play position said second control is locked in neutral position and when said second control is in forward or rewind position said first control is locked in off position, separate coacting brake means engaged simultaneously with each of said reels when said first control is moved to play position or said second control is moved to rewind or release position and released simultaneously when said first control is turned to off position or said second control is turned to neutral position, said motor-actuated drive spindle having a fly wheel and motor-energized pulley means for driving said fly wheel, said pulley means including a plurality of pulley wheels of graduated size, each of said intermediate pulley wheels having a flange, and belt means connecting said fly wheel and one of said pulley wheels, and belt shifter means for moving said belt from one of said pulley wheels to the flange of an adjacent pulley whereby to change the speed of play of said tape recorder during use.

9. In a tape recorder having a pair of reels and a motor-actuated drive spindle, a manually operable off-play control, a manually operable control adapted to effect forward or rewind action, a cam plate on said first control, said cam plate defining a recess therein, a cam disc on said second control, said cam disc defining a recess therein, a ball bearing, means for retaining said ball bearing between said cam plates for reception in one or the other of said recesses selectively whereby when said first control is in play position said second control is locked in neutral position and when said second control is in forward or rewind position said first control is locked in off position, separate coacting brake means engaged simultaneously with each of said reels when said first control is moved to play position or said second control is moved to rewind or release position and released simultaneously when said first control is turned to off position or said second control is turned to neutral position, said motor-actuated drive spindle having a fly wheel and motor-energized pulley means for driving said fly wheel, said pulley means including a plurality of pulley wheels of graduated size, each of said intermediate pulley wheels having a flange, belt means connecting said fly wheel and one of said pulley wheels, belt shifter means for moving said belt from one of said pulley wheels to the flange of an adjacent pulley whereby to change the speed of play of said tape recorder during use, and manually operable helical cam means for actuating said belt shifter means.

10. In a tape recorder, a pair of reels, one of which serves as a take-up reel, a motor, a capstan driven by said motor, an idler movable into and out of engagement with said capstan for transporting tape therebetween, a releasable transmission for driving said take-up reel at a predetermined rate of speed, a brake normally engaging each reel while idle, a brake moving member movable to an inoperative position in which the brakes are applied to the reels and to an alternate position in which the brakes are released, first manual means for conditioning the recorder to play including connecting members actuating said transmission, releasing said brakes and bringing said idler into engagement with said capstan with one movement of said first manual means, second manual means for connecting said motor and the other of said reels and releasing said brakes and said transmission, and means interlocking said first and second manual means for selective operation exclusive of the other, said second manual means including a rotatably mounted handle shiftable in an axial direction and an element obstructing rotatable movement of the handle until shifted in an axial direction.

11. In a tape recorder, a pair of reels, a motor, releasable means driven by said motor for moving tape from one of said reels to the other of said reels including a drive spindle, a roller element releasably engaging the drive spindle and a manual member movable to play position, a brake for each of said reels urged into engagement therewith, means including interacting elements between said manual member and brakes actuated by said manual member for simultaneously moving each of said brakes out of braking relation with the reel associated therewith when said manual member is placed in play position, means for moving said roller element from engagement with said spindle including a manually operable member, and means interlocking said members for selective operation, said interlocking means including a ball supported against movement in one plane and disposed in interference relationship with said members in a direction transverse to said plane, said members being recessed to receive the ball in said transverse direction in their resting position.

12. In a tape recorder, a pair of reels, a motor, releasable means driven by said motor for moving tape from one of said reels to the other of said reels including a drive spindle, a roller element releasably engaging the drive spindle and a manual member movable to play position, a brake for each of said reels urged into engagement therewith, means including interacting elements between said manual member and brakes actuated by said manual member for simultaneously moving each of said brakes out of braking relation with the reel associated therewith when said manual member is placed in play position, means for retracting said roller element from engagement with said spindle including an edit bar operative manually to retract said roller element when said manual member is in play position, and a manually operable member retracting said roller element when the said manual member is out of play position, and means interlocking said members for selective operation.

13. In a tape recorder, a pair of reels, a motor, releasable means driven by said motor for moving tape from one of said reels to the other of said reels including a drive spindle, a roller element releasably engaging the drive spindle and a manual member movable to play position, a brake for each of said reels urged into engagement therewith, means including interacting elements between said manual member and brakes actuated by said manual member for simultaneously moving each of said brakes out of braking relation with the reel associated therewith when said manual member is placed in play position, means for moving said roller element from engagement with said spindle including a manually operable member, means interlocking said members for selective operation, and means controlled by said manually operable member for moving said motor and said one of said reels into drive engagement and said one of said reels out of engagement with its brake for moving the tape from the other reel to said one reel.

14. In a tape recorder, a pair of reels, a motor, releasable means driven by said motor for moving tape from one of said reels to the other of said reels including a drive spindle, a roller element releasably engaging the drive spindle and a manual member movable to play position, a brake for each of said reels urged into engagement therewith, means including interacting elements between said manual member and brakes actuated by said manual member for simultaneously moving each of said brakes out of braking relation with the reel associated therewith when said manual member is placed in play position, means for moving said roller element from engagement with said spindle including a manually operable member, and means interlocking said members for selective operation, and an element controlled by said manually operable member for moving said one of the reels away from said brake.

15. In a tape recorder, a pair of reels, a brake for each of said reels normally engaging said reels when idle, a motor, means driven by said motor for moving tape from one to the other of said reels including a drive spindle element and a roller element for engaging said spindle element, a first control means for selectively disengaging and engaging said elements in "off" condition and operative "play" condition to release the tape or transport the tape at a predetermined playing speed respectively, a second control means for disengaging said elements in "forward" or "rewind" positions respectively to release the tape for transportation at a speed greater than said predetermined speed, means actuated by each of said control means for simultaneously moving each of said brakes out of braking engagement with the reel associated therewith when said first control means is placed in operative condition and for simultaneously applying the brakes when both of said control means are placed in inoperative condition, and editing means for disengaging said elements when said first control means is in operative position.

16. In a tape recorder, a pair of reels, a brake for each of said reels normally engaging said reels when idle, a motor, means driven by said motor for moving tape from one to the other of said reels, a first control means for placing said tape moving means in "off" released condition and "play" operative condition selectively to transport the tape at a predetermined playing speed, a second control means for releasing said tape moving means in operative "forward" and "rewind" conditions respectively for the transport of the tape at a speed greater than said predetermined speed, means including a slide element movable to an operative position when actuated by each of said control means for simultaneously moving each of said brakes out of braking engagement with the reel associated therewith when said first control means is placed in operative condition and to an inoperative position for simultaneously applying the brakes when both of said control means are placed in inoperative condition, and means for releasing said tape moving means when said second control means is in inoperative position.

17. In a tape recorder, a pair of reels, one of which serves as a take-up reel, a motor, a capstan driven by said motor, an idler roller movable into and out of engagement with said capstan for transporting tape therebetween, a releasable transmission for driving said take-up reel at a predetermined rate of speed, a brake normally engaging each reel while idle, a brake moving member movable to an inoperative position in which the brakes are applied to the reels and to an alternate position in which the brakes are released, first manual means for conditioning the recorder to play including connecting members actuating said transmission, releasing said brakes and bringing said idler into engagement with said capstan with one movement of said first manual means, second manual means for connecting said motor and the other of said reels and releasing said brakes and said transmission, means interlocking said first and second manual means for selective operation exclusive of the other, and editing means for moving said idler roller and capstan out of engagement when said first manual means is in its play position.

References Cited in the file of this patent

UNITED STATES PATENTS

| | | |
|---|---|---|
| 2,665,855 | Stone | Jan. 12, 1954 |
| 2,782,263 | Hoehn et al. | Feb. 19, 1957 |